United States Patent
Meretakis et al.

(10) Patent No.: US 12,511,664 B2
(45) Date of Patent: Dec. 30, 2025

(54) SYSTEM AND METHOD FOR AUTOMATICALLY OPTIMIZING CUSTOMER COMMUNICATION

(71) Applicant: Google LLC, Mountain View, CA (US)

(72) Inventors: Dimitris Meretakis, Zürich (CH); Zigmars Rasscevskis, Zürich (CH); Vinsensius B. Vega S. Naryanto, Zürich (CH); Tom Beyer, Zurich (CH); Szabolcs Payrits, Zug (CH); Martin Stolle, Zürich (CH); Mark Steven Schadler, Zollikon (CH); Jack Willow Waldron, Riehen (CH); Ali Galip Bayrak, Zurich (CH)

(73) Assignee: Google LLC, Mountain View, CA (US)

( * ) Notice: Subject to any disclaimer, the term of this patent is extended or adjusted under 35 U.S.C. 154(b) by 113 days.

(21) Appl. No.: 18/289,945

(22) PCT Filed: Dec. 15, 2022

(86) PCT No.: PCT/GR2022/000072
§ 371 (c)(1),
(2) Date: Nov. 8, 2023

(87) PCT Pub. No.: WO2024/127047
PCT Pub. Date: Jun. 20, 2024

(65) Prior Publication Data
US 2025/0054022 A1    Feb. 13, 2025

(51) Int. Cl.
G06Q 30/02     (2023.01)
G06Q 30/0242   (2023.01)
G06Q 30/0251   (2023.01)

(52) U.S. Cl.
CPC ..... *G06Q 30/0246* (2013.01); *G06Q 30/0255* (2013.01); *G06Q 30/0267* (2013.01)

(58) Field of Classification Search
CPC .................. G06Q 30/0207–30/0277
See application file for complete search history.

(56) References Cited

U.S. PATENT DOCUMENTS

| | | | | |
|---|---|---|---|---|
| 9,706,008 | B2* | 7/2017 | Rajan | H04L 67/535 |
| 10,210,536 | B1* | 2/2019 | Wai | G06Q 30/0247 |
| 11,030,649 | B1* | 6/2021 | Barakat | G06Q 30/0254 |
| 2011/0208585 | A1* | 8/2011 | Daboll | G06Q 10/00 709/224 |
| 2013/0132191 | A1* | 5/2013 | Galai | G06Q 30/0251 705/14.49 |
| 2014/0180810 | A1* | 6/2014 | Boal | G06Q 30/04 705/14.53 |
| 2014/0222506 | A1* | 8/2014 | Frazer | G06Q 30/02 705/7.29 |

(Continued)

OTHER PUBLICATIONS

International Search Report and Written Opinion for International Application No. PCT/GR2022/000072 dated Jun. 16, 2023. 15 pages.

*Primary Examiner* — Thuy N Nguyen
(74) *Attorney, Agent, or Firm* — Lerner David LLP

(57) ABSTRACT

The present disclosure provides a closed loop, self-learning system that automatically optimizes what experiences should be presented to each customer. Instead of relying on rules and external targeting, it observes customer reactions to continuously improve performance and adapt to environment changes.

19 Claims, 12 Drawing Sheets

(56) References Cited

U.S. PATENT DOCUMENTS

| | | | |
|---|---|---|---|
| 2014/0280251 A1* | 9/2014 | Somekh | G06F 16/9535 |
| | | | 707/754 |
| 2014/0365314 A1* | 12/2014 | Torrens | G06Q 30/0269 |
| | | | 705/14.66 |
| 2015/0012350 A1* | 1/2015 | Li | G06Q 30/0243 |
| | | | 705/14.42 |
| 2015/0220999 A1* | 8/2015 | Thornton | H04M 15/805 |
| | | | 705/14.66 |
| 2016/0210657 A1 | 7/2016 | Chittilappilly et al. | |
| 2017/0255945 A1 | 9/2017 | McCord et al. | |
| 2018/0139294 A1* | 5/2018 | Ju | G06Q 30/0255 |
| 2018/0232762 A1* | 8/2018 | Greene | G06Q 30/0255 |
| 2019/0278378 A1 | 9/2019 | Yan et al. | |
| 2021/0081984 A1* | 3/2021 | Yamashita | G06Q 20/102 |
| 2021/0142387 A1* | 5/2021 | Gupta | G06Q 30/0217 |
| 2021/0216920 A1* | 7/2021 | Mimassi | G06F 16/2379 |
| 2021/0365973 A1* | 11/2021 | Guild | G06Q 30/0235 |
| 2022/0391938 A1* | 12/2022 | Sridhar | G06Q 30/0224 |
| 2023/0051225 A1* | 2/2023 | Nair | G06F 18/285 |
| 2023/0104187 A1* | 4/2023 | Robert Jose | G06Q 30/0242 |
| | | | 707/738 |
| 2023/0252484 A1* | 8/2023 | Crouse | G06Q 10/06315 |
| | | | 705/304 |
| 2023/0252521 A1* | 8/2023 | Vanderveld | G06N 5/01 |
| | | | 705/14.66 |
| 2023/0410139 A1* | 12/2023 | Chang | G06Q 30/0215 |
| 2023/0410195 A1* | 12/2023 | Schwartz | G06Q 40/03 |
| 2024/0362673 A1* | 10/2024 | Ben-Or | G06Q 10/0637 |

* cited by examiner

SYSTEM AND METHOD FOR AUTOMATICALLY OPTIMIZING CUSTOMER COMMUNICATION

CROSS-REFERENCE TO RELATED APPLICATIONS

This application is a national phase entry under 35 U.S.C. § 371 of International Application No. PCT/GR2022/000072, filed Dec. 15, 2022, the disclosure of which is hereby incorporated herein by reference.

BACKGROUND

Businesses engage their customers across multiple channels, such as web, mobile, email, call centers, physical branch locations, third-party advertising, etc. Communication should be coordinated and consistent across all of the relevant channels. Messages deployed to the customers, which may be commercial or non-commercial in nature, should be shown at the right moment to maximize reaction while respecting customer experience. The messages should be highly relevant for end-users and lead to good customer experience and contribute to desired business outcomes.

Real Time Interaction Management is enterprise marketing and customer experience technology that delivers contextually relevant experiences, value, and utility at the appropriate moment in the customer lifecycle via preferred customer channels. Such systems use customer data, real-time customer interactions, predictive modeling, machine learning and business rules to deliver those experiences.

However, existing solutions extensively rely on static customer segmentation and on rules for targeting which customer should see what message. The customer segments and the rules need to be created and maintained for each individual message as conditions change. It requires prioritizing when multiple messages are triggered for the same customer from their respective rules. Performance suffers due to the insufficiently precise targeting by rules. Existing systems can be inefficient as a business needs to allocate data science teams to do targeting or to create and maintain user dimensions that in turn can be targeted by rules. User feedback is either not captured at all, captured very slowly resp manually, or only online reactions are captured. Events that happen offline are not captured. Moreover, existing systems are not aware of the context which affects user reaction.

BRIEF SUMMARY

The present disclosure provides a closed loop, self-learning system that automatically optimizes what experiences should be presented to each customer based on provided business goals. Instead of relying on rules and external targeting, it learns optimal targeting and observes customer reactions and business outcomes to continuously improve its performance and adapt to environment changes.

One aspect of the disclosure provides a computer-implemented method of communication, comprising receiving data relating to an institution and their customers, training a machine learning model using the received data, determining a context for the customer at any given time, selecting, using the machine learning model, one or more experiences for delivery to the customer based on the determined context and provided business goal, delivering the one or more experiences to the customer, identifying, using a measurement service, one or more customer actions, and updating the machine learning model using this measurement.

According to some examples, the method may further include determining, with the one or more processors, a value and cost associated with each of the one or more customer actions, and updating the machine learning model using the value. The value may be based on a benefit to the institution from the action and a cost to the institution for the action. The data may include products or services offered by the institution, and products or services utilized by the customer.

According to some examples, receiving the data relating to at least one of the institution or the customer comprises ingesting the data through an application programming interface.

The context may include a communication channel being used by the customer at a given time, the communication channel being a medium through which the customer communicates with the institution. The context may further include a touchpoint within the communication channel, the touchpoint including a point in communication between the customer and the institution. The touchpoint may be, for example, a web page or a mobile application screen displayed to the customer at the given time. The touchpoint may include an in-person or telephonic communication.

According to some examples, selecting the one or more experiences may include identifying one or more of a plurality of pre-populated experiences, each including specific content, and selecting the one or more experiences based on the content and the customer context. Each experience may further include a specific format, and selecting the one or more experiences may include matching the format of the one or more experiences with a format required by the context.

Another aspect of the disclosure provides a system, comprising one or more memories and one or more processors in communication with the one or more memories. The one or more processors may be configured to receive data relating to an institution and its customers, train a machine learning model using the received data, determine a context for the customer at a given time, select, using the machine learning model, one or more experiences for delivery to the customer based on the determined context and provided business goal, deliver the one or more experiences to the customer, identify one or more customer actions, and updating the machine learning model using measurements related to the one or more customer actions.

In some examples, the one or more processors may be further configured to determine a value and cost associated with each of the one or more customer actions, and update the machine learning model using the value. The data may include products or services offered by the institution, and products or services utilized by the customer.

According to some examples, the system may further include an ingestion interface adapted to receive the data relating to at least one of the institution or the customer.

In some examples, the context may include a communication channel being used by the customer at a given time, the communication channel being a medium through which the customer communicates with the institution. The context may include a touchpoint within a communication channel, the touchpoint including a point in communication between the customer and the institution. The touchpoint may be one of a web page or a mobile application screen displayed to the customer at the given time.

Selecting the one or more experiences may include identifying one or more of a plurality of pre-populated experiences, each including specific content, and selecting the one or more experiences based on the content and the customer context. Each experience may further include a specific format, and wherein selecting the one or more experiences comprises matching format of the one or more experiences with a format required by the context.

Yet another aspect of the disclosure provides a non-transitory computer-readable medium storing instructions executable by one or more processors for performing a method of communication. Such method may include receiving data relating to an institution and its customers, training a machine learning model using the received data, determining a context for the customer at a given time, selecting, using the machine learning model, one or more experiences for delivery to the customer based on the determined context and provided business goal, delivering the one or more experiences to the customer, identifying one or more customer actions, and updating the machine learning model using measurements related to the one or more customer actions.

DETAILED DESCRIPTION

Overview

Figure 1:
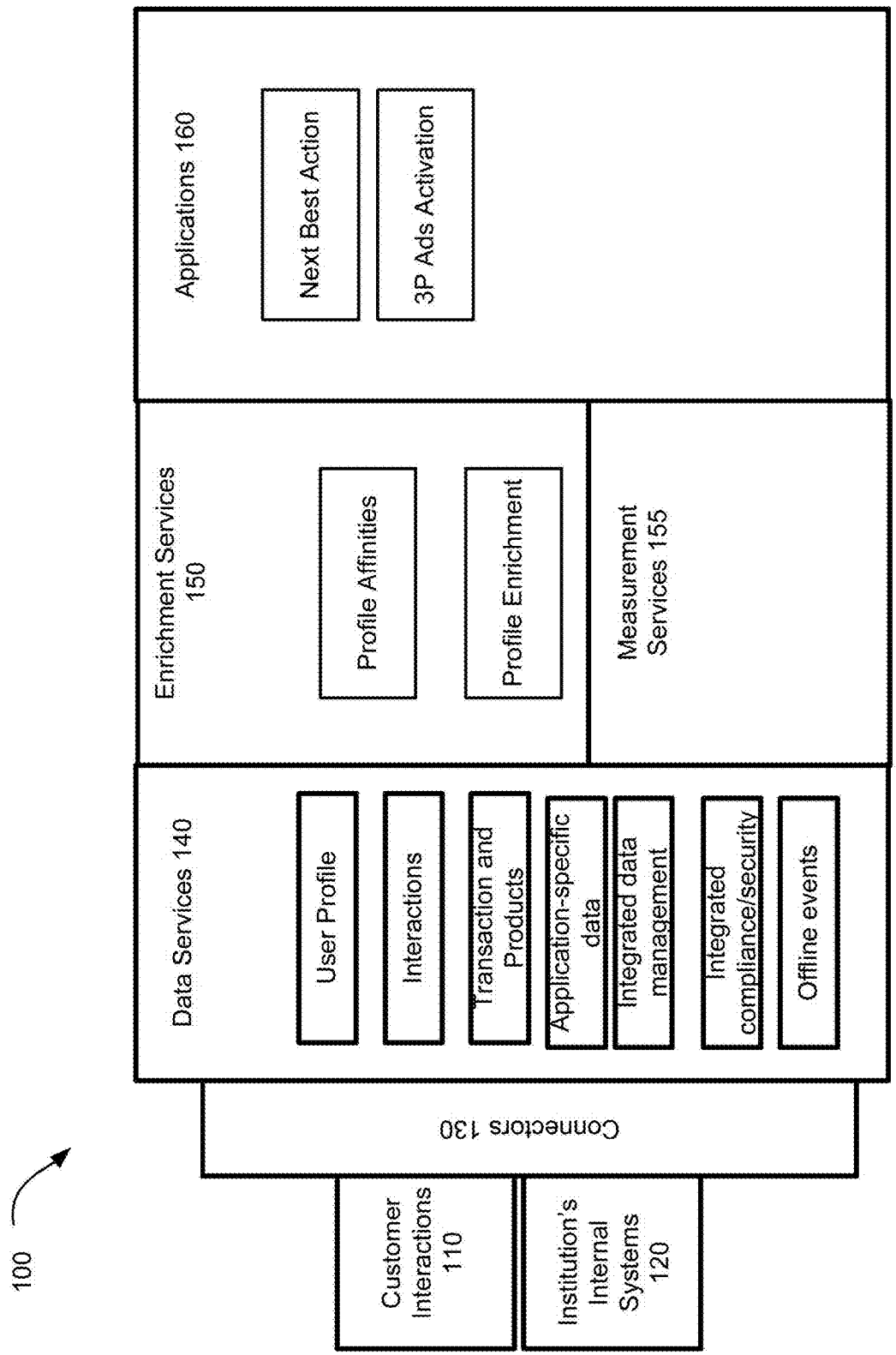
FIG. 1 is a block diagram illustrating an example data intelligence platform according to aspects of the disclosure.

The self-learning system described in the present disclosure includes various components and subsystems. For example, the self-learning system includes core data ingestion tools, business data tools, communication channel establishing tools, message management tools, interaction data ingestion tools, service tools, business measurement and management tools, reporting tools, and an artificial intelligence engine.

Core data ingestion tools may include application programming interfaces (APIs) and other tools through which a business may ingest and continuously update customer data, core business data, transaction data, etc. Customer data may include, for example, information about customers and their characteristics, such as general geographic location, interests, preferences, time they became a customer, customer segment, demographic information, etc. Core business data may include an identification of products and services that customers use. For example, where the business is a financial institution, the business data may identify that a given customer uses a specific type of credit card and a specific savings account, but does not have a mortgage. As another example, where the business is a telecommunications provider, the business data may identify that the customer uses a specific mobile plan and a specific data plan and a specific home broadband Internet service. Transaction data may include an indication of what customers are buying and how they consume services and subscriptions. By way of example, where the business is the financial institution, the transaction data may include individual purchases made using the credit card. In the telecommunications provider example, the transaction data may identify metadata about calls, such as when they happened, duration of call, signal quality, etc.

Business data tools may include, for example, tools for a business to ingest their portfolio of products and services. For example, such tools may include an API or other interface. The businesses' portfolio of products and services can include all the offerings of a business. For example, a financial institution may offer mortgage lending, educational lending, personal lending, checking and savings accounts, other types of accounts, safe deposit boxes, etc.

Communication channel establishing tools may include an API or other tools for a business to define the channels through which they communicate with customers. Such channels may include, for example, a mobile app, web site, call center, physical branch, etc. Each channel may have various touch points within it. For example, such touch points may include pages within a web site, conversation types for a call center, or the like. The communication channel establishing tools can also define details about where and how experiences can be presented in those channels.

Messaging tools can be utilized by a business to create and manage experiences. Experiences can include messages, reports, educational content, personalized content, interactive content, or any other material that can be presented to a user. An experience can be of commercial or non-commercial nature. Commercial experiences can be associated with specific products or services to which they relate. In some examples, experiences may have associated information about the suggested recipients, explicitly targeted recipients, eligible recipients, etc.

Interaction data ingestion APIs allow a business to ingest events capturing where and how customers interact with the various channels and touchpoints, the experiences with which customers are presented, and how customers react to those experiences. For example, reactions can include click, dismiss, accept, reject, etc.

Serving APIs can be integrated with the channels to receive requests from a specific touchpoint and respond with the best experience to present for a given user at a given point in time.

A measurement engine can be configured by the business without additional engineering support to measure the business value generated by user actions and/or the cost generated by user actions. The business value can include, for example, transaction revenue for product purchases, revenue generated through subscription and use of products or services such as transaction fees per transaction, or non-commercial value such as value associated with following a non-commercial recommendation). The business cost can include, for example, a cost associated with maintaining a customer relationship, such as a cost associated with specific interactions in some of the touchpoints. For example, such costs may include the cost of a servicing call to a call center.

Goal management tools may define what the system should optimize for when considering what experiences to present. For example, the business may want to optimize for maximizing generated revenue, gross profit, or other metrics.

A machine learning engine may continuously process the ingested core data, experience data, interaction data and the output of the measurement engine to learn what users are interested in under specific conditions and contexts, and how much value can be generated by a customer acting on a given message. The machine learning engine determines a response for every serving API request. For example, the response can be content (e.g., a video, image, graphic, etc.), an experience, a message, or some combination of these and other information. By observing the flow of customer interaction and the stream of events with business value or cost that follow an interaction, the system continuously updates its predictions to maximize its performance and adapt to changing user behaviors and changing environments.

A reporting interface may be utilized by the business to measure the performance of the provided experiences across various dimensions. It may further be used to measure a total generated value, whether generated by the experiences or not.

The system described herein provides channel awareness and experience awareness. It understands the structure of the channels to which it is connected, and how users behave in each channel. It further understands different experiences and is able to choose the right experience to promote a given product or service to a given customer. There is no need for manual rules, as the system can be fully automated and discovers the right targeting itself by using its machine learning engine. Continuous, integrated measurement is provided as feedback loop. By observing all the customer interactions and the events that generate value, the system continuously updates its machine learning models to adapt to changing environments and changing user behaviors.

Example Systems

FIG. 1 illustrates an example architecture of a data intelligence platform 100 according to aspects of the disclosure. As shown, the platform 100 includes a data services component 140, a data enrichment component 150, and an applications component 160. Each of the components may be interconnected such that information in one component may be utilized by another component. The components receive information from both customers and institutions when permissions are granted by such customers and institutions. The information may be received How through connectors 130, such as data integration services, data analytics platforms, or other tools for receiving data.

Customer interactions 110 can include any type of communication or activity of a user relative to the institution. By way of example only, interactions can include clicks or views on a web site or mobile application, visits to a physical location, calls to a call center or customer service line, or any of a variety of other activities. Such interactions may be made through any of a variety of communication tools or interfaces, such as web, mobile applications, short message service (SMS), e-mail, push notifications, ads, referrals, physical locations such as stores or bank branches or other locations, call centers, etc.

Institution's internal systems 120 can include any tools used by an institution, such as a business, in their operations. Such systems may include, for example, customer relations management tools, databases, or other systems. The systems may be used to manage inventory, orders, sales, purchases, transactions, consumer feedback, rewards programs, promotions, or other information or events.

The information from customer interactions 110 and the institution's internal systems 120 can be ingested into the data services component 140, such as through connectors 130. The data services component may store data that can be used to optimize a customer experience when interacting with the institution. Such data may include, for example, a user profile, interactions, transactions and products, application-specific data, etc.

According to some examples, the data services component 140 may have various capabilities, such as integrated data management capabilities, integrated compliance and security capabilities, etc. For example, the integrated data management capabilities may include access permission controls per application and per user at the level of tables, rows, and columns. The data management capabilities may provide a benefit in how user data is managed. Alternatively or additionally, the data management capabilities may include provenance tracking, data quality management, or any of a variety of other utilities. The compliance and security capabilities may include, for example, access transparency, data residency, downstream deletion of data, etc. Access transparency may include, for example, preventing access for any reason other than fulfilling contractual obligations, requiring valid justification for access by support or engineering personnel, near real-time logs of when administrators access content, etc. Data residency relates to where the data is stored geographically.

In some example implementations, the enrichment services component 150 may provide for profile affinities, profile enrichment, etc. Profile affinities may indicate interests of a user, such as activities or events the user is interested in, purchases the user may be interested in making, etc. Profile enrichment may include augmenting data about users with additional information or understandings. For example, enriching a user profile may include identifying a base set of interests and identifying potential further interests sharing some relationship to the base set of interests. As one example, if a user travels frequently, the user profile may be enriched with attributes of a frequent traveler, such as interest in ridesharing, luggage, dining, etc. If a user recently purchased a motorcycle, the profile may be enriched with an interest in motorcycle insurance. In this regard, profile affinities and enrichment may include observations regarding the user and inferences based on such observations.

Measurement services 155 may analyze data in the data services 140 and create a key performance indicator (KPI), which can be set as an objective for a next best action. The measurement services 155 may further create metrics for determining how well the objective has been met. By way of example, the measurement services 155 may analyze raw data in the data services 140, which includes information regarding numerous online and offline events for various consumers. The measurement services may create one or more KPIs based on such data, such as how many credit cards are opened each day, revenue, etc. Such KPIs may be used to set objectives, such as opening N new credit card accounts per day.

The applications component 160 may include applications specific to the institution or other applications. For example, where the institution is a business, the applications may include a mobile app for the business. Other applications may include a "next best action" application, which determines a communication to be sent to the customer at a particular time for optimizing engagement and/or customer experience. Another example application may be a third party (3P) ads activation that uses measurements and customer data to perform advertising in the third party ad systems. According to some examples, applications may be developed by third parties. For example, data from the data services 140 and enrichment services 150 may be accessible through API, such as batch and/or real-time, cloud data warehouse mirroring, etc. The data may flow seamlessly to cloud platform solutions, such as machine learning development environments or the like. Separate access control may be provided for application specific data. For example, controls may govern which data each application can use.

Figure 2:
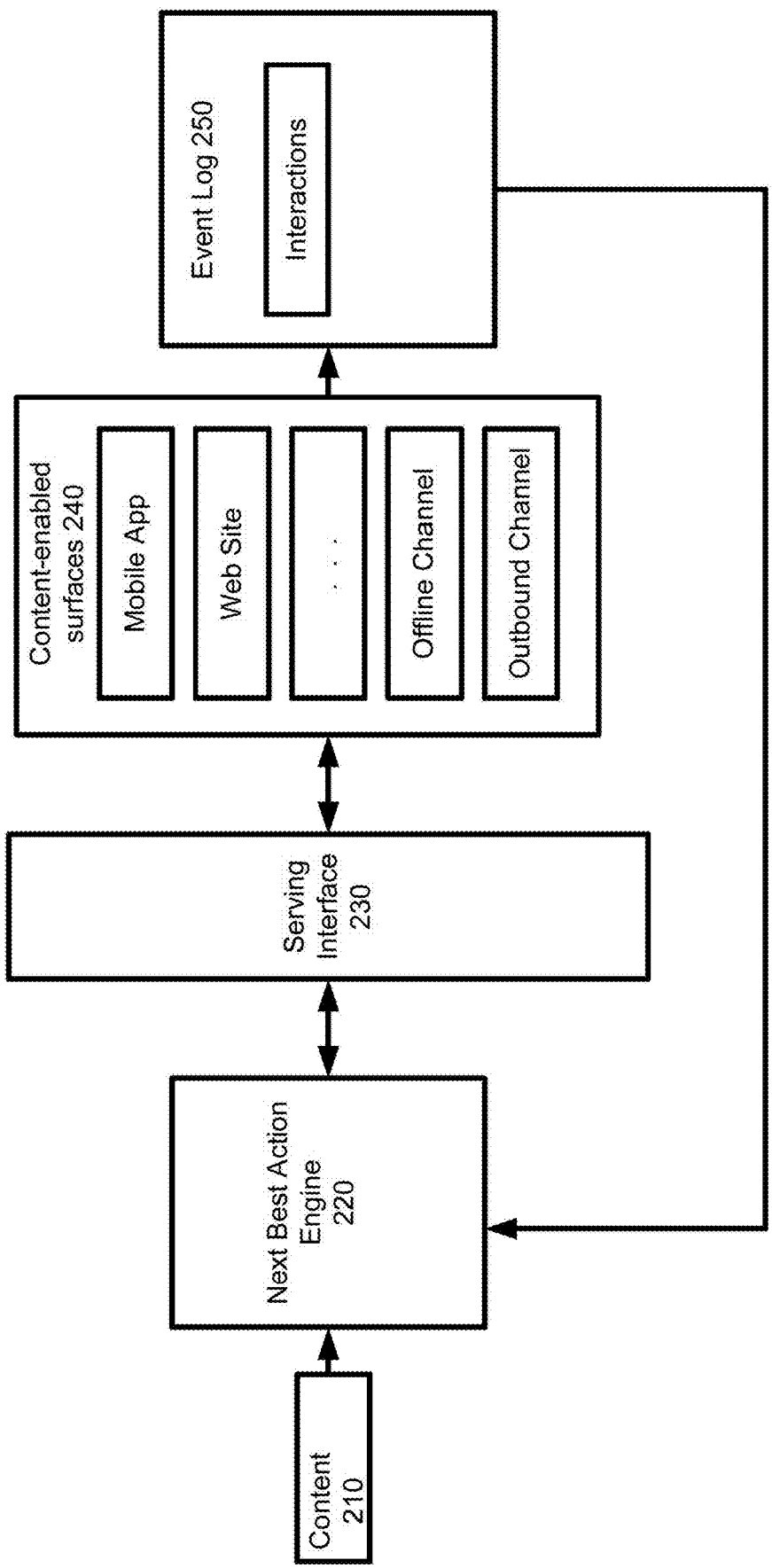
FIG. 2 is a flow diagram illustrating an example operation of the data intelligence platform according to aspects of the disclosure.

FIG. 2 is an example flow diagram illustrating an overview of serving content using the data intelligence platform described above. Next best action engine 220 delivers optimized content 210 to one or more content enabled surfaces 240, such as through a content-serving interface 230. Interactions based on one or more first messages may be used to update the next best action engine 220 to improve delivery of one or more second messages.

The content 210 may include, for example, promotions, advertisements, offers, etc. According to other examples, the content 210 may include media content, such as movies, video clips, images, music, etc. According to further examples, the content 210 may include other types of content of potential interest to a user.

The next best action engine 220 may be, for example, a machine learning engine trained with data relevant to the user. For example, the machine learning engine may be trained using user profile data, interactions, etc. The data may be ingested from the user, institutions, or other sources. An example of such ingestion is described below in connection with FIG. 3.

The content serving interface 230 may receive information from the content-enabled surfaces 240 and provide it to the next best action engine 220. Moreover, the content serving interface 230 may receive content selected by the next best action engine 220 and provide such content to the content-enabled surfaces 240. The interface 230 may be, for example, an API or other type of interface. The information may be exchanged through the interface using remote procedure calls (RPCs) or other communication formats.

According to some examples, the interface 230 may receive an identification of a given user and a context for the user, and provide such identification to the next best action engine 220. For example, the user may be identified by user name, account, or other identifier. The context may include activity by the user, such as usage of the content-enabled surfaces. Such activity may include views, clicks, accesses, calls, or the like. According to some examples, the activity may include pauses in activity, such as a pause in scrolling at a particular portion of a web page. The activity may be performed with respect to particular content, such as services, offerings, text, or other content presented through the content-enabled surfaces 240. Users may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In response to providing the next best action engine 220 with the identification of user and context, the serving interface 230 may receive from the next best action engine 220 content selected by the engine for serving to one or more of the content-enabled surfaces 240. The content may be selected by the next best action engine 220 based on the received user identification and context.

The content-enabled surfaces 240 may include any of a number of communication channels through which an institution can communicate with the user. For example, the surfaces may include a mobile application, a web site, SMS, email, push notification, or other online communication channel. In some examples, the surfaces may include offline channels, such as a service center, and/or outbound channels, such as a call center. While a few examples of communication channels are identified, it should be understood that these are merely examples and not limiting.

When permitted by the user, interactions may be captured, such as in event log 250, and provided to the next best action engine 220 as feedback. The interactions may include impressions, clicks, conversions, or other engagements with the content that was selected by the next best action engine 220 and served through the content-enabled surfaces 240. User permission may be granted by, for example, setting on a user device allowing for information sharing. The feedback may be used to update the next best action engine 220, such that improved content selections may be made in response to future requests for content.

Figure 3:
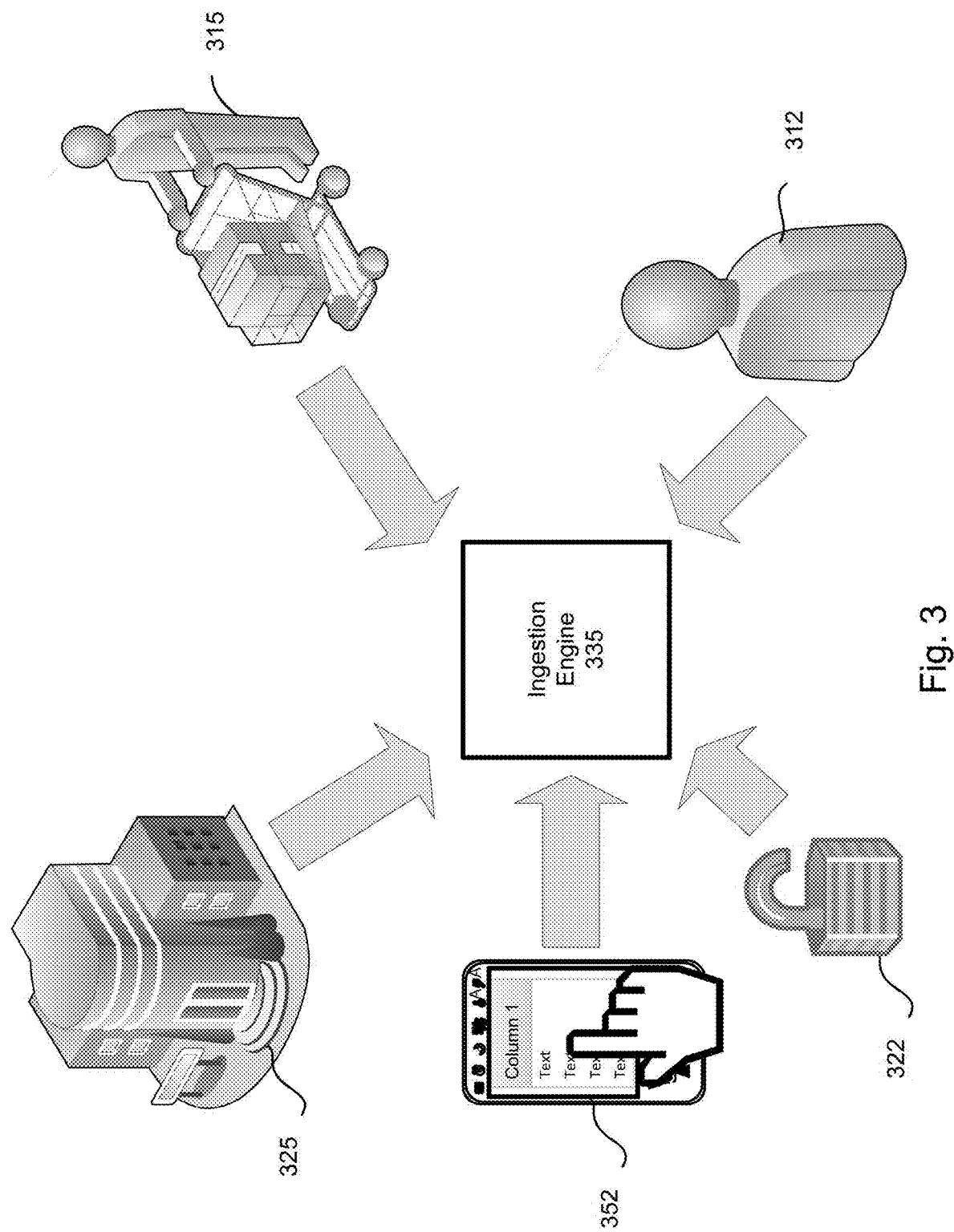
FIG. 3 is a pictorial diagram illustrating an example of ingesting data to the data intelligence platform according to aspects of the disclosure.

FIG. 3 illustrates an example of ingesting data, such as the data used to train the next best action engine 220 of FIG. 2. Ingestion engine 335 may receive data from institutions, customers, or other sources.

The ingestion engine 335 may ingest business data 325, which may include data relating to an institution or business. For example, business data may include an identification of all products and services offered by a particular business, such as a catalog of products and services with accompanying details, and properties or metadata of such products. The business data 325 may additionally or alternatively include message and serving configuration information. For example, the business data 324 may include a catalog of channels, touchpoints, interaction units, experiences, messages, creatives, rending formats, touchpoint configurations, etc. In some examples the business data 325 may further include experiences, such as messages or interactive communications. For example, the experiences can include a promotion, such as a special offer. In other examples, the experiences can include an insight, such as information indicating trends or projections based on the customer's activity, or a status of the customer's account. It should be understood that other types of experiences are also possible. Moreover, the business data 325 may include eligibility information, indicating which experiences each customer is eligible to receive. By way of example only, eligibility information may indicate that a student credit card is only available for students, and thus only customers known to be students or potential students may see messages regarding such student credit cards.

The ingestion engine 335 may also ingest customer data 312. Customer data 312 may include, for example, information about customers and their characteristics. By way of example, such information may include profile information indicating characteristics of the user, such as general geographic location, age, education, employment, etc. The customer data 312 may indicate customer interests, explicit or implicit preferences, etc. Such information may be explicitly supplied by the user, or inferred through information gathered with the user's authorization. For example, browsing history, views, clicks, site visits, or the like be used to identify content of likely interest to the user. According to some examples, the customer data 312 may further include account information, indicating a state of products and services that the customer has signed up for. A user may be provided with controls allowing the user to make an election as to both if and when such information is collected. In addition, certain data may be treated in one or more ways before it is stored or used, so that personally identifiable information is removed. For example, a user's identity may be treated so that no personally identifiable information can be determined for the user, or a user's geographic location may be generalized where location information is obtained, so that a particular location of a user cannot be determined. Thus, the user may have control over what information is collected about the user, how that information is used, and what information is provided to the user.

The ingestion engine 335 may ingest transaction data 315. Transaction data 315 may include an indication of what customers are buying and how they consume services and subscriptions. By way of example, where the business is the financial institution, the transaction data may indicate particular purchases made using their credit card. In the telecommunications example, the transaction data may identify particular calls placed or received, minutes used, etc. According to some examples, the transaction data 315 may include card and account transactions. The transaction data 315 may also include information indicating customer usage of other products and services which is not expressed as transactions.

The ingestion engine 335 may ingest interaction data 352. Such interaction data 352 may include session metadata for website or mobile application sessions, phone calls, message exchanges, etc. It may also include events within a session, indicating specific content presented, message impressions and clicks, form fills, page views, call topics, etc.

The ingestion engine 335 may include one or more processors executing a software interface. The ingestion engine 335 may continuously receive data. According to some examples, the data may be stored in a database (not shown) in communication with the ingestion engine 335. The data received by the ingestion engine may be used to update the next best action engine 220 of FIG. 2. While a few examples of the types of data ingested are described above, it should be understood that additional data may also be ingested and used in training the machine learning model to select most relevant content at a particular time for serving to the user for a high probability of engagement. Relationships among the data may be ingested and/or identified by one or more processors based on the ingested data. For example, such relationships may link customer information with transaction information for transactions executed by the customer.

Figure 4:
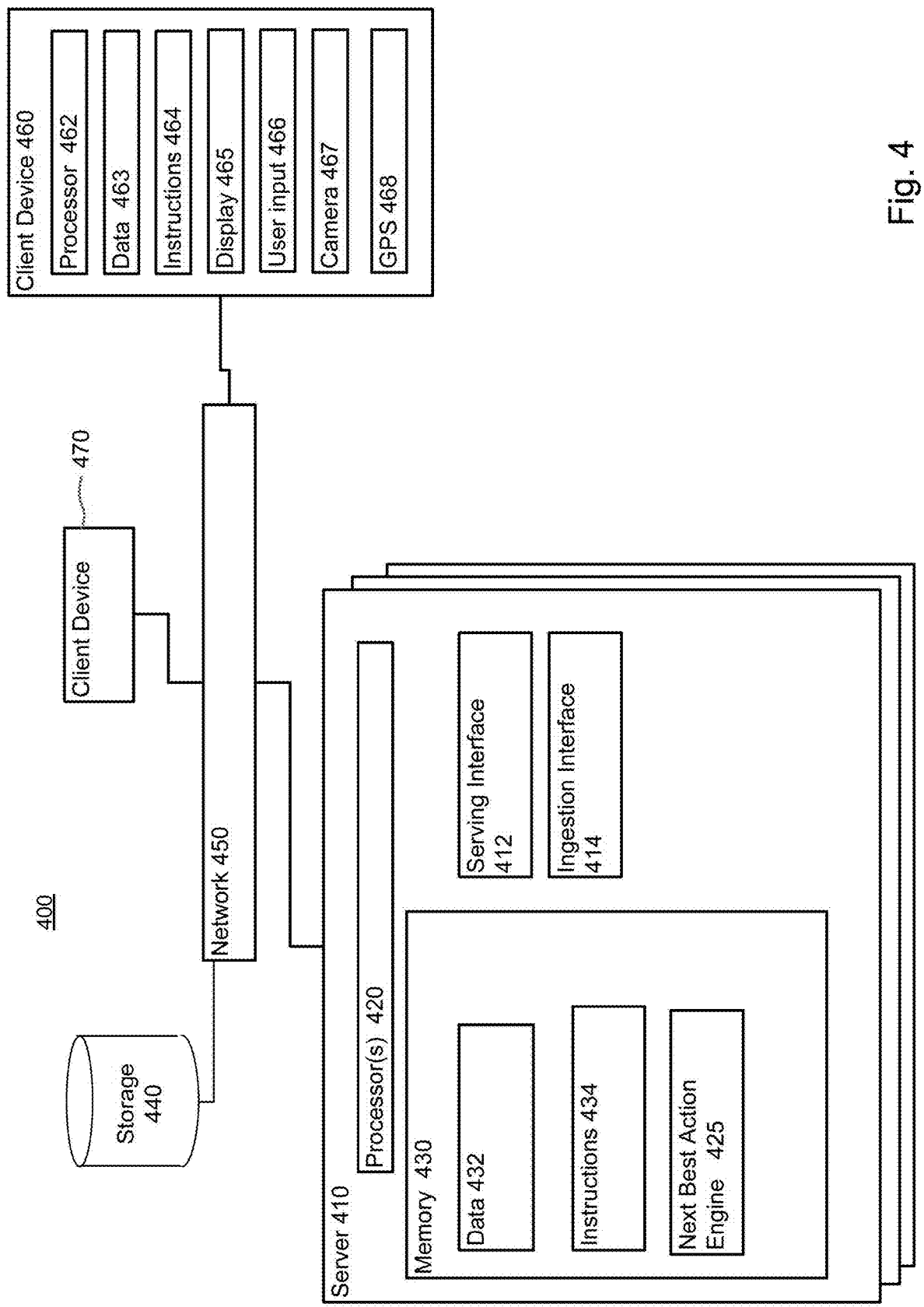
FIG. 4 is a block diagram illustrating an example system according to aspects of the disclosure.

FIG. 4 illustrates an example system 400 including computing devices for performing aspects of the present disclosure. The system 400 includes various client computing devices 460, 470 communicatively coupled to one or more server computing devices 410 through a network 450.

The server computing device 410 may in some examples include a plurality of processing devices in communication with one another. Each of the server computing devices 410 can contain one or more processors 420, memory 430 and other components typically present in general purpose computing devices. Memory 430 of each computing device 410 can store information accessible by the one or more processors 420, including instructions 434 that can be executed by the one or more processors 420.

Memory 430 can also include data 432 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 434 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 432 may be retrieved, stored or modified by the one or more processors 420 in accordance with the instructions 434. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 420 can be any conventional processors, such as a commercially available CPU. Alternatively, the processors can be dedicated components such as an application specific integrated circuit ("ASIC") or other hardware-based processor. Aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing neural networks, and any combination thereof.

Although FIG. 4 functionally illustrates the processor, memory, and other elements of computing device 410 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 410. Accordingly, references to a processor, computer, computing device, or memory will be understood to include references to a collection of processors, computers, computing devices, or memories that may or may not operate in parallel. For example, the computing devices 410 may include server computing devices operating as a load-balanced server farm, distributed system, etc.

The server computing devices 410 may further include one or more machine learning engines, such as next best action engine 425, for selecting optimized content and experiences to be served to the client devices 460, 470. The machine learning engine can generate a machine learning model using the historical signals and corresponding features. For example, the machine learning model can be generated using feature data such as customer data, product data, interactions, or other types of data, including over time. Such feature data may be used, in some examples, to train the machine learning model. Protections will be put in place to ensure that customer privacy remains protected. For example, users may be required to specifically authorize information reporting to receive optimized content. In some examples, the users may be required to download a particular application or other software, and agree to the terms of use, in addition to enabling information reporting. Users maybe provided with the option to add or remove their devices from consideration at any time by, for example, setting a reporting mode on the device to "off." Additional provisions are made for further protecting privacy and security. For example, additional provisions include aggregation of data, filtering of personal information, encryption, hashing or filtering of personal information to remove personal attributes, time limitations on storage of information, or limitations on data use or sharing.

The machine learning engine can generate, maintain, or update the model. The machine learning engine can be configured with one or more machine learning techniques to generate the model. The machine learning techniques can include one or more statistical techniques, for example, a supervised machine learning technique, neural network, regression technique, linear regression technique, Bayesian estimator, etc.

The one or more processors 420 can receive signals used to update the machine learning model. The signals may include, for example, feedback from first content served to the client computing devices 460, 470. Such feedback may include impressions, clicks, views, or other interactions or engagements. The feedback can be used to update the machine learning model to determine a value or success of the first content, and to adjust parameters for selecting second content, such that the second content can have an equal or greater value or success when delivered to the client computing devices 460, 470. The machine learning engine can work with, integrate with, or interface with other components, such as APIs or other interfaces, other processing engines, etc.

The server computing device 410 may further include one or more interfaces, such as serving interface 412, ingestion interface 414, etc. Such interfaces may be used to facilitate communication between the processors 420 or machine learning engines of the server 410 and one or more of the client devices 460, 470 or the database 440. For example, the ingestion interface 414 may be used to receive the data used for generating, training, and updating the machine learning model as described above. The serving interface 412 may be used for serving selected content to the client devices 460, 470. The interfaces 412, 414 may be, for example, APIs, or other types of software interfaces, hardware interfaces, etc. While the serving and ingestion interfaces are shown as separate components, in other examples they may be different aspects of the same interface. Moreover, while the interfaces 412, 414 are shown as being hosted by the server 410, it should be understood that they may alternatively be hosted by other computing devices, such as third party computing devices. While a few example interfaces are shown, additional or fewer interfaces may be included.

The client computing devices 460, 470 may include any of a variety of types of devices capable of communicating over a network. By way of example and not limitation, such devices may include smart phones, cameras with wireless network access, laptops, smartwatches, tablets, head-mounted displays, gaming systems, etc. Each client computing device may include, for example, user input devices such as cameras, microphones, joysticks, buttons, touch screens, etc. The client computing devices 460, 470 may include content-enabled surfaces, such as a display, which could include, for instance, an LED, LCD, plasma screen, projector, etc. Content may alternatively or additionally be provided through audio, haptic, or other types of output mechanisms of the client computing devices 460, 470.

Each of the client computing devices 460, 470 may be configured similarly to the server computing devices 410, with one or more processors, memory and instructions as described above. Each client computing device 460, 470 may be a personal computing device intended for use by a user, and have all of the components normally used in connection with a personal computing device such as a processor 462, memory (e.g., RAM and internal hard drives) storing data 463 and instructions 464, a display 465, and user input 466. The client computing device may also include a camera 467 for recording video streams and/or capturing images, speakers, a network interface device, and all of the components used for connecting these elements to one another. The client computing device 460 may also include a location determination system, such as a GPS 468. Other examples of location determination systems may determine location based on wireless access signal strength, images of geographic objects such as landmarks, semantic indicators such as light or noise level, etc.

Although the client computing devices 460, 470 may each comprise a full-sized personal computing device, they may alternatively comprise mobile computing devices capable of wirelessly exchanging data with a server over a network such as the Internet. By way of example only, client computing device 460 may be a mobile phone or a device such as a wireless-enabled PDA, a tablet PC, a netbook, a smart watch, a head-mounted computing system, or any other device that is capable of obtaining information via the Internet. As an example, the user may input information using a small keyboard, a keypad, microphone, using visual signals with a camera, or a touch screen.

As an example, each of the computing devices 410 may include web servers capable of communicating with databases 440 as well as computing devices 460, 470 via the network 450. For example, one or more of server computing devices 410 may use network 450 to transmit and present information to a user on a display, such as display 465 of computing device 460. In this regard, computing devices 460, 470 may be considered client computing devices and may perform all or some of the features described herein.

Each of the computing devices 410, 460, 470 can be at different nodes of a network 450 and capable of directly and indirectly communicating with other nodes of network 450. Although only a few computing devices are depicted in FIG. 4, it should be appreciated that a typical system can include a large number of connected computing devices, with each different computing device being at a different node of the network 450.

Databases 440 may be accessible by the server 410. The databases 440 may include, for example, information associated with user profiles, interactions, or other data. The databases 440 may alternatively or additionally store content for delivery to the client devices 460, 470 through one or more experiences. Such content may include, for example, text, images, video, audio, advertisements, promotions, or other types of content.

Databases 440 may store data, such images and other information corresponding to particular entities. As with memory 430, databases 440 can be of any type of computerized storage capable of storing information accessible by the server computing devices 410, such as a hard-drive, memory card, ROM, RAM, DVD, CD-ROM, write-capable, and read-only memories. In addition, databases 440 may include a distributed storage system where data is stored on a plurality of different storage devices which may be physically located at the same or different geographic locations. Databases 440 may be connected to the computing devices via the network 450 as shown in FIG. 4 and/or may be directly connected to any of the computing devices 410.

The network 450 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information. The network 450 itself can include various configurations and protocols including the Internet, World Wide Web, intranets, virtual private networks, wide area networks, local networks, and private networks using communication protocols proprietary to one or more companies. The network 450 can support a variety of short- and long-range connections. The short- and long-range connections may be made over different bandwidths, such as 2.402 GHZ to 2.480 GHz, commonly associated with the Bluetooth® standard, 2.4 GHZ and 5 GHZ, commonly associated with the Wi-Fi® communication protocol; or with a variety of communication standards, such as the LTE® standard for wireless broadband communication. The network 410, in addition or alternatively, can also support wired connections between the computing devices 410, 460, 470, including over various types of Ethernet connection.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

Figure 5A:
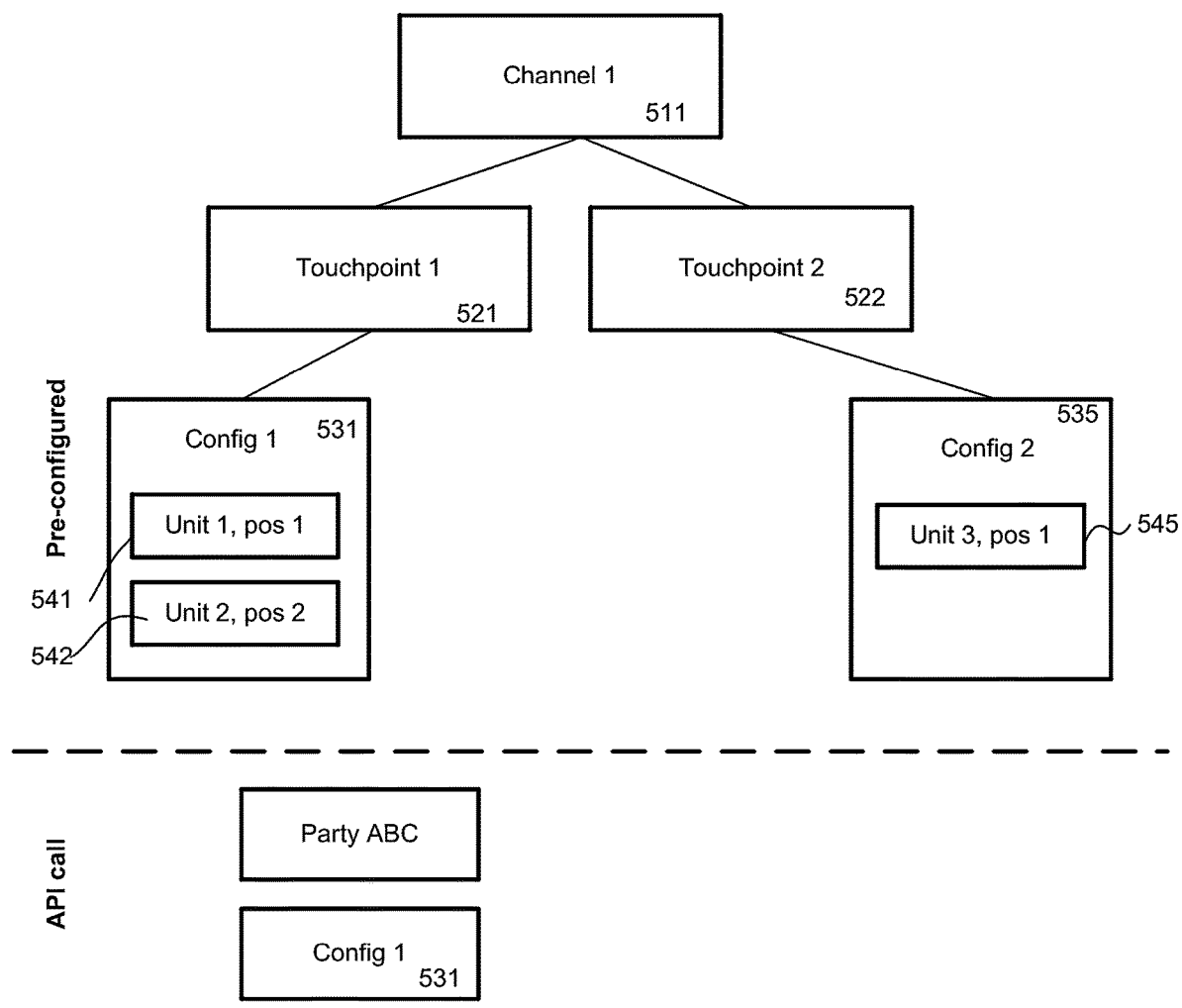
FIG. 5A is a hierarchical block diagram illustrating an example architecture of a touchpoint and configuration structure according to aspects of the disclosure.
Figure 5B:
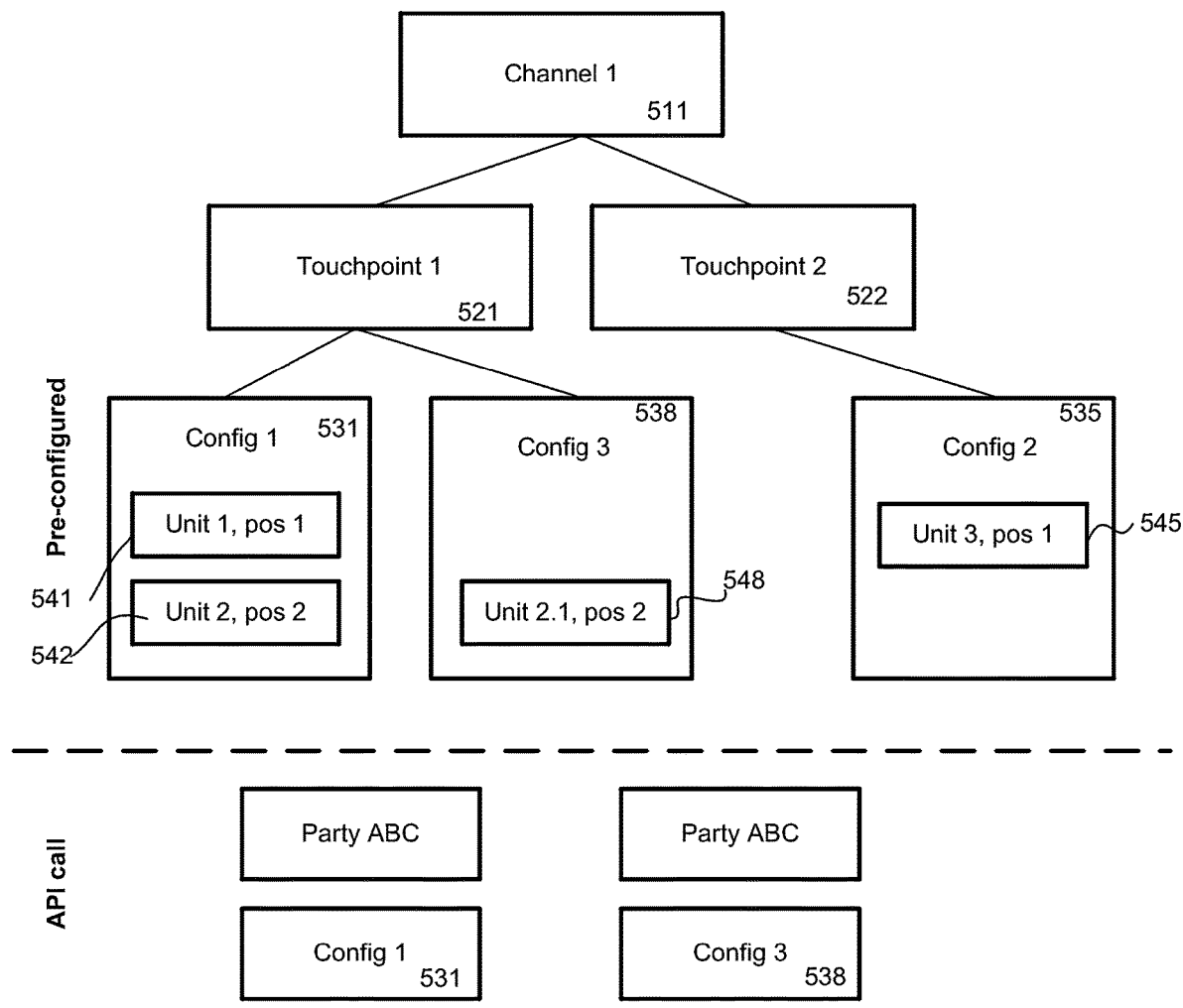
FIG. 5B is a hierarchical block diagram illustrating an example of updating a configuration according to aspects of the disclosure.

FIGS. 5A-5B illustrate experiences pre-configuration. FIG. 5A illustrates an example architecture of a channel and touchpoint structure for serving content using the data intelligence platform described herein.

A channel 511 represents a medium through which customers interact with services of the institution or business. For example, channels can include a web site, mobile app, service call center, relationship manager, kiosk, automated teller machine, or any of a variety of other devices or communication tools.

A touchpoint 521, 522 represents a moment in the customer experience with a fixed visual or conversational context. Examples of touchpoints can include a homepage of an application, an interstitial after log-in, a moment in time when a call-center agent resolves an issue, etc. According to some examples, touchpoints 521, 522 may be inbound or outbound. By way of example, inbound touchpoints may be initiated by a customer, such as when the customer opens an application, visits a physical location of the institution, places a call to a call-center, etc. Outbound touchpoints may be initiated by the institution. For example, an institution may proactively reach out to a customer, such as by sending an email, SMS, phone call, push notification, etc. Touchpoints may be owned and operated by an institution. According to some examples, institutions may hire third parties to interact with customers or potential customers on the touchpoints. For example, the institutions may activate third party ads by hiring a third party to serve ads over the touchpoints.

An interaction unit 541, 542, 545 represents a specific place within a touchpoint 521, 522 that can be used to show one or more experiences. For example, the interaction unit can be an area or portion of a web page where banners or other content can be displayed. In other examples, the interaction unit can be a pop-up box, a link in a push notification, etc.

A configuration 531, 535 represents a collection of interaction units that can be shown together on a given touchpoint.

FIG. 5B illustrates an example of how a configuration can be extended and used for a customer, "Party ABC". In this example, a new configuration 538 is added. The new configuration 538 can be used in an API call for some or all traffic. Through this mechanism, an institution can evaluate performance of different experiences observed by Party ABC.

Figure 6:
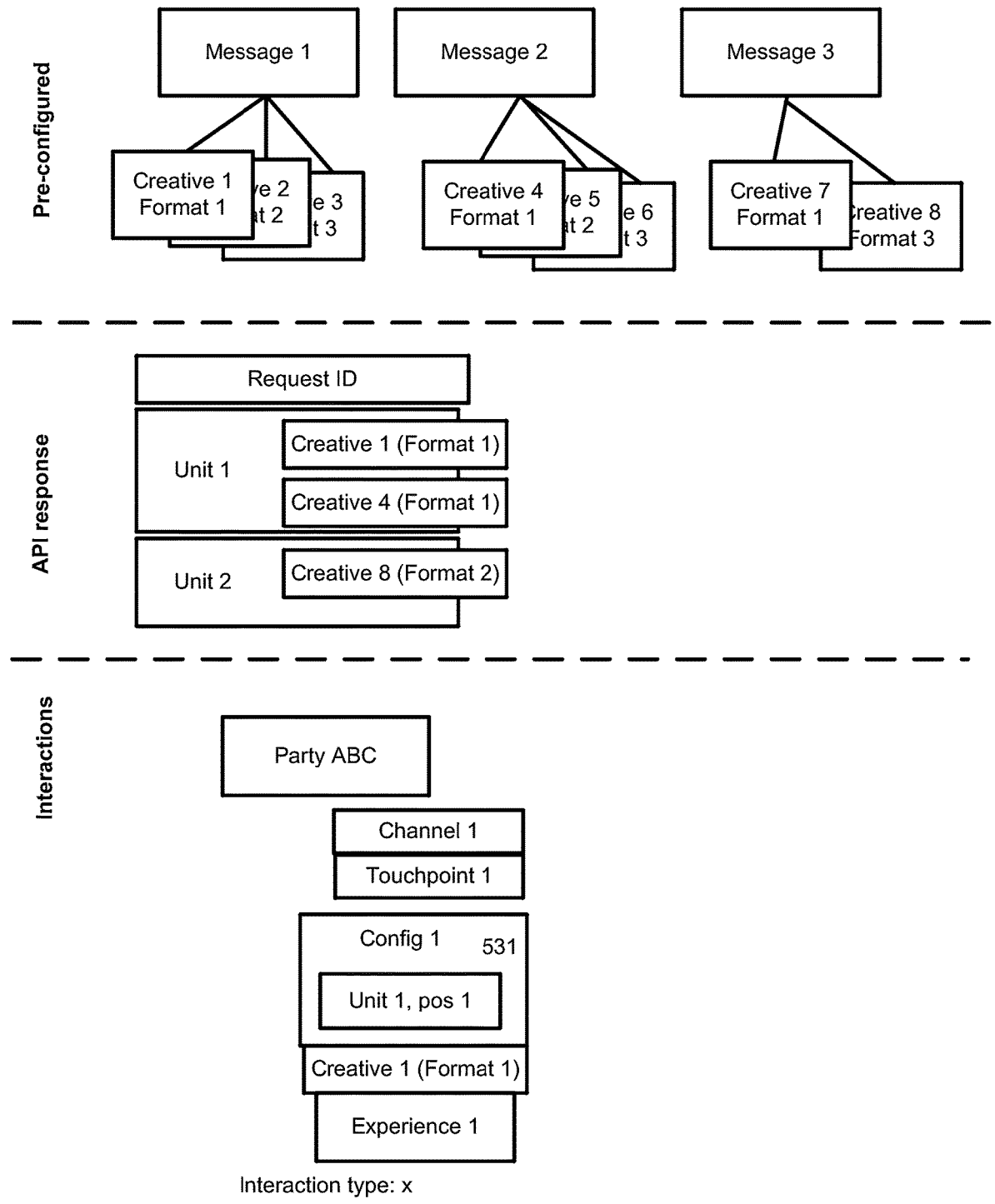
FIG. 6 illustrates an example architecture of an experience and response structure according to aspects of the disclosure.

FIG. 6 illustrates an example architecture of a message and response structure. An experience represents a communication with specific messaging. Example experiences can include messages, for example, text such as "Try our one-click-loan commission free." The request may be, for example, an API call. Config 1 may be a banner layout.

A creative represents a specific way to render the experience. The creative may depend on available space, or a format required in a given space. The format may include an arrangement of text, images, or other content. By way of example only, Creative 1 Format 1 may include a small image with text on the right side, and Creative 2 Format 2 may include text only, without an image.

The API response specifies which creatives to show in each position in each interaction unit on a given touchpoint. The format of each creative may match the format required by the interaction unit.

Figure 7:
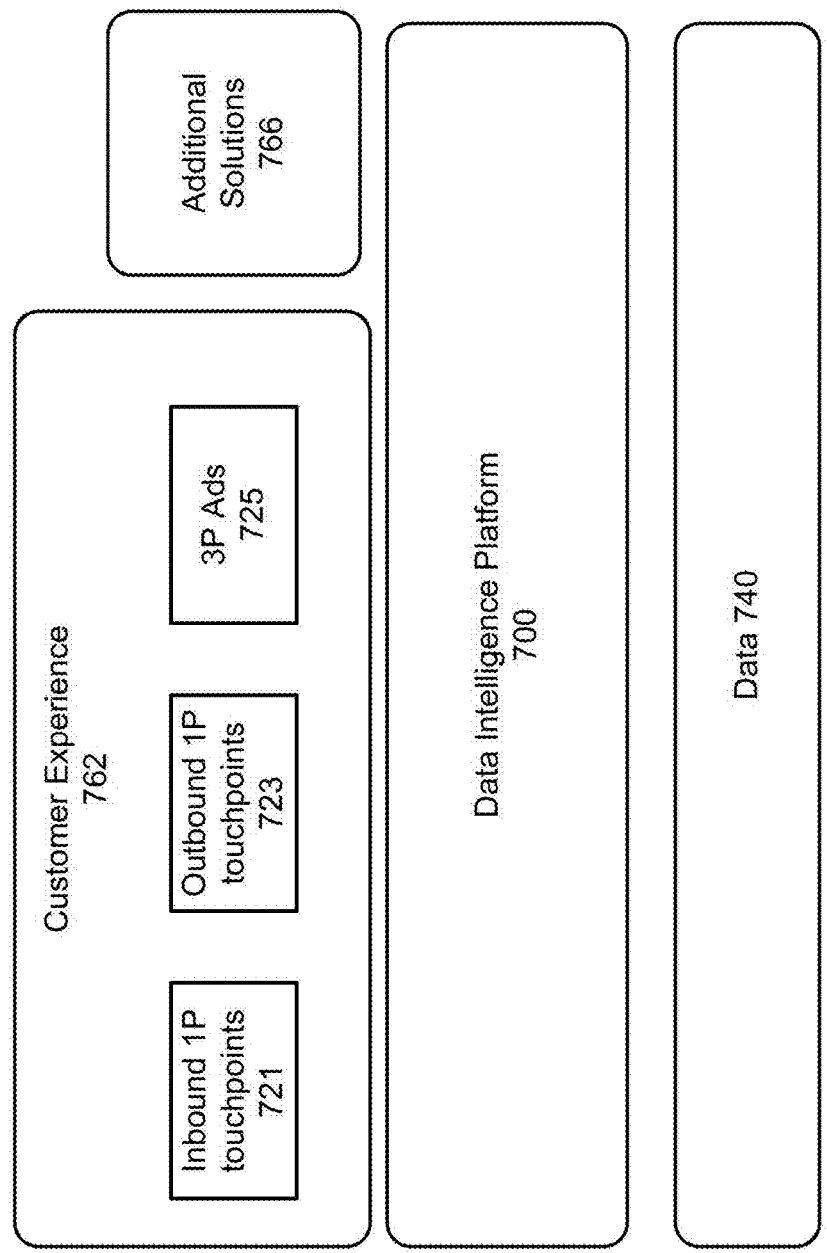
FIG. 7 is a block diagram illustrating an example overview of various use cases supported by the data intelligence platform according to aspects of the disclosure.

FIG. 7 illustrates an example overview of various use cases supported by the data intelligence platform described herein. According to some examples, a single data layer 770 may support multiple artificial intelligence (AI) applications. By way of example, such AI applications may include customer experience applications 762 or other example applications 766. Messaging may be served for such applications over various touchpoints, such as inbound touchpoints 721, outbound touchpoints 723, and/or third party ads 725. A data layer may integrate various types of data 740 through purpose built connectors, cloud platform solutions, or other connectors as described above in connection with FIG. 1. Such data 740 may include, by way of example only, data from institutional systems, customer activities, third party data, etc. Such data 740 may only be supplied by customers with authorization from the customers, such as by enabling reporting features, accepting authorization prompts, etc.

Figure 8:
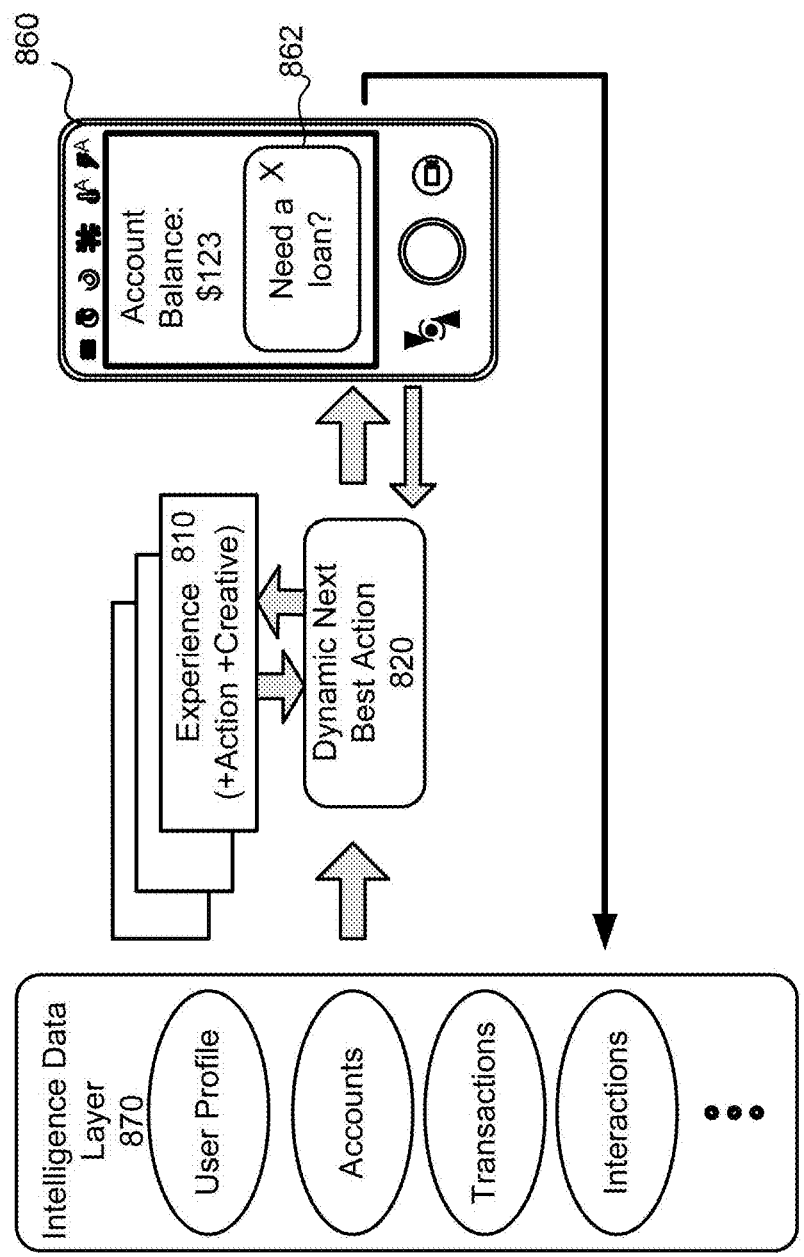
FIG. 8 is a flow diagram illustrating an example use case of determining a next best action using the data intelligence platform according to aspects of the disclosure.

FIG. 8 illustrates an example use case of determining a next best action using the data intelligence platform described herein. A marketing or customer experience team may provide candidate experiences 810 to promote specific actions. Such candidate experiences 810 may be generated based on, for example, data in data layer 870. Dynamic next best action engine 820 learns what is most effective, and iterates.

An API request may be received for a given customer, such as user of device 860, and context. The context, for example, may indicate information such as a date and time, what the customer is currently looking at or interacting with or using, etc. The next best action engine 820 may, in real-time, select one of the candidate experiences 810 and return the selected message 862 with a specific creative for the customer based on the customer and context. The selected message 862 may be displayed, for example, on the user device 860. Interactions with the selected message 862 are identified and fed back to the data layer 870 for use in continuously updating the next best action engine 820. The interactions may include, by way of example, user impressions, clicks, rejections, or other actions. According to some examples, some interactions may occur off device 860. Examples of such off-device interactions may include visits to a physical location of an institution and conversations with a customer service person at the location, or completing transactions through a kiosk at the location. Such off-device interactions may be captured by Measurement Service component of the intelligence data layer 870. In some examples, on-device interactions with the selected message 862 may be fed directly to the next best action engine 820.

Figure 9:
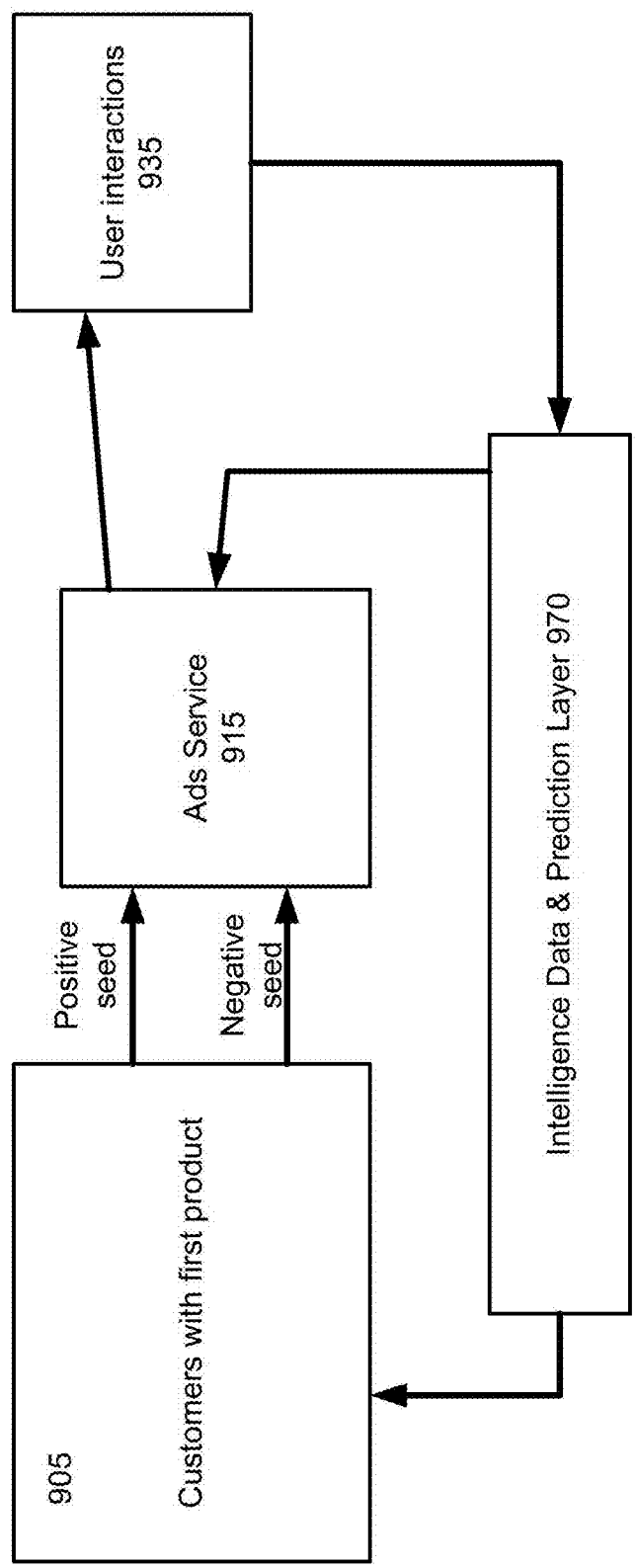
FIG. 9 is a flow diagram illustrating another example use case relating to third party ads activation using the data intelligence platform according to aspects of the disclosure.

FIG. 9 illustrates another example use case relating to third party ads activation using the data intelligence platform described herein. Box 905 represents customer information, including current customers utilizing a first product offered by the institution. The customers can be identified by an identifier. The customer information can include a value associated with each customer identifier. The value may indicate, for example, a value to the institution based on the customer's utilization of the product. By way of example, a customer that orders 10 units of a product every month may have a higher value associated with their identifier as compared to a second customer that orders 2 units of the product per quarter. In some instances, a customer identifier may be associated with a negative value. For example, if the customer does not order product, but the institution has a cost associated with offering the product to the customer, the result may be a negative value. The positive and negative values are supplied as seed values to an ad service 915. Intelligence data and prediction layer 970 also provides intelligence data to the ad service 915. Such intelligence data may include, for example, conversion data and associated values to steer bidding for return on ads spend.

Ads service 915 selects an ad for serving to a particular customer at a particular time, for example using a machine learning model trained and updated using the customer data 905 and intelligence data 970. Interactions 935 with the ads are identified, such as by determining clicks-throughs, conversions, or other engagement. The interactions 935 are supplied to the intelligence data 970 such that the machine learning model can be updated to improve ad selection for subsequent serving of ads.

The intelligence data and prediction layer 970 may further optimize conversion data. For example, a user may click on an advertisement, which directs the user to the bank's website, where the user registers, opens up an account, and makes transactions. This process may take multiple days or weeks, and for an aggregate of customers there may be a high drop off rate between each step. For example, the bank may not approve each customer for an account. At each step, the intelligence data and prediction layer 970 may predict and report back the likelihood of the user getting to the next step and an associated value to an advertisement system. Such reports may include, for example, an analysis of other data associated with users most likely to reach the next step. This information may be used to optimize advertisements or other experiences served to other users to help drive more qualified and valuable clicks to the bank. For example, advertisements may be tailored, in terms of content, format, timing etc., to users that will drive more revenue for the bank.

The intelligence and data prediction layer 970 may include measurement services, as discussed above in connection with FIG. 1. The measurement services may be used to define and evaluate business outcomes. For example, a focus definition may specify which party or account is in scope based on its properties, such as an account of type credit card that is currently blocked. The focus definition can also apply to all parties or accounts. A change definition may specify what should change. For example, a change definition may relate to an attribute change, such as changing an account state from blocked to unblocked. As another example, a change definition may relate to a new interaction/transaction of a specific type happening or a new account of a specific type being opened. The desired business outcome may be determined to occur if, for an entity in the focus definition, the change defined by the change definition occurs. Accordingly, the business can define the value of that business outcome. The value can be a fixed amount or it can be a function of the observed or predicted actions of the customer. For example, where the business outcome is a conversion, the conversion value may be a function of a mortgage amount, a predicted future credit card spend over N months, etc.

To optimize for the business outcome, the system may automatically identify proxy conversions. Proxy conversions are events that are likely leading to the business outcome. For example, using a mortgage calculator tool is a proxy conversion for the business outcome of signing a mortgage contract. The business can also specify their own proxy conversions to help in situations with sparser historic data. According to some examples, the system may first verify that business-specified proxy conversions correlate with the business outcome prior to utilizing such proxy conversions.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
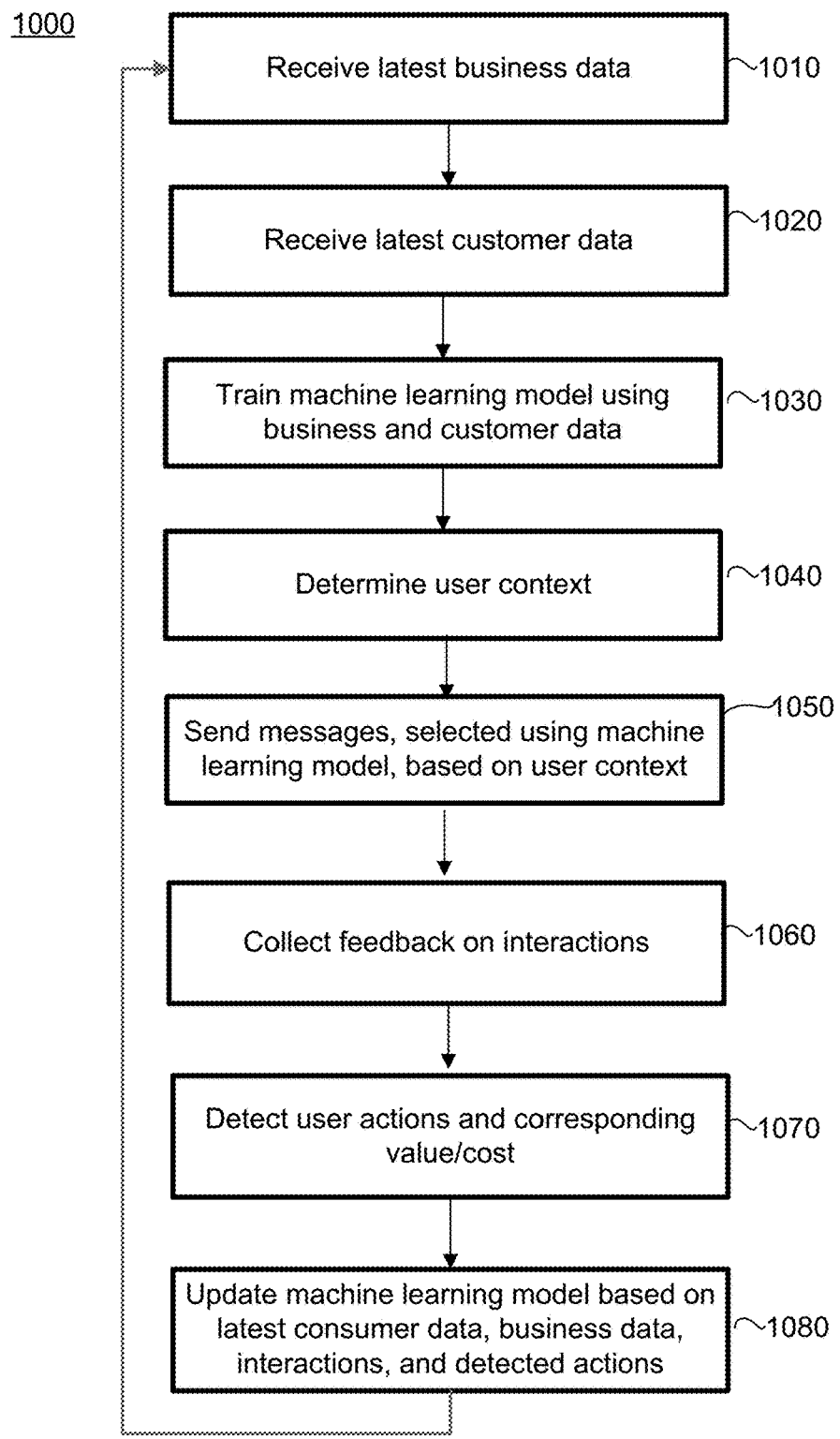
FIG. 10 is a flow diagram illustrating an example method according to aspects of the disclosure.

FIG. 10 illustrates an example method 1000 of using a data intelligence platform to optimize messaging to customers. The method may be performed by, for example, a remote server or other computing device. The method may or may not be initiated by a request for information about an entity from a user.

In block 1010, business data is received at the data intelligence platform. The business data may be ingested, for example through an API, from the business. The business data may include, for example, information regarding products, offerings, inventory, services, promotions, etc. According to some examples, transaction data may also be received. Such transaction data may indicate what customers are buying and how they consume services and subscriptions.

In block 1020, customer data is received at the data intelligence platform. The customer data may be ingested from the customers. The customer data may include, for example, profile data, such as demographics, preferences, etc. According to some examples, other types of data may also be received.

The business and customer data may be privacy protected. For example, the data may not be shared outside the data intelligence platform, and its use may be limited to serving particular content to the customer. The information may be filtered and/or aggregated such that no personally identifiable information is included. The information may be stored only temporarily. Moreover, the customer information may be received only when authorized by the customer, such as through permission settings, accepting requests, etc.

In block 1030, a machine learning model is trained using the business, transaction, and customer data. The machine learning model may be trained to select experiences to be provided to a customer at a particular time and/or in a particular context. The experiences may be, for example, messages or other types of interactive content that include promotions, news, entertainment, or the like.

In block 1040, context for the customer is determined. For example, the context may include a data, time of day, content being displayed on the customer's device, customer activity, or any of a combination of these or a variety of other factors.

In block 1050, the machine learning model selects an experience based on the determined context. For example, a plurality of pre-populated experiences may be stored. The experiences may have different formats, creatives, content, etc. One or more of the pre-populated experiences may be selected based on any or all of the format, creatives, content, etc. to most closely match predictions for what the customer will most likely engage. The experience is sent to the customer.

In block 1060, customer interactions with the selected experience are identified. Such interactions may include, for example, views, clicks, rejections, of any of a variety of other actions that the customer may take with respect to the selected experience. In some examples, a corresponding value or cost for the interactions may also be identified (block 1070). For example, different interactions may have different associated costs. Costs may be defined by a business or institution, and may quantify resources consumed in delivering a message to a customer or user. For example, the cost may quantify resources consumed, such as minutes of a phone call.

In block 1080, the machine learning model may be updated based on the interactions and the associated value or cost. For example, a message with an associated cost may be used to update the machine learning model such that a similar message will not be provided to the customer in a similar context at a subsequent time.

Figure 11:
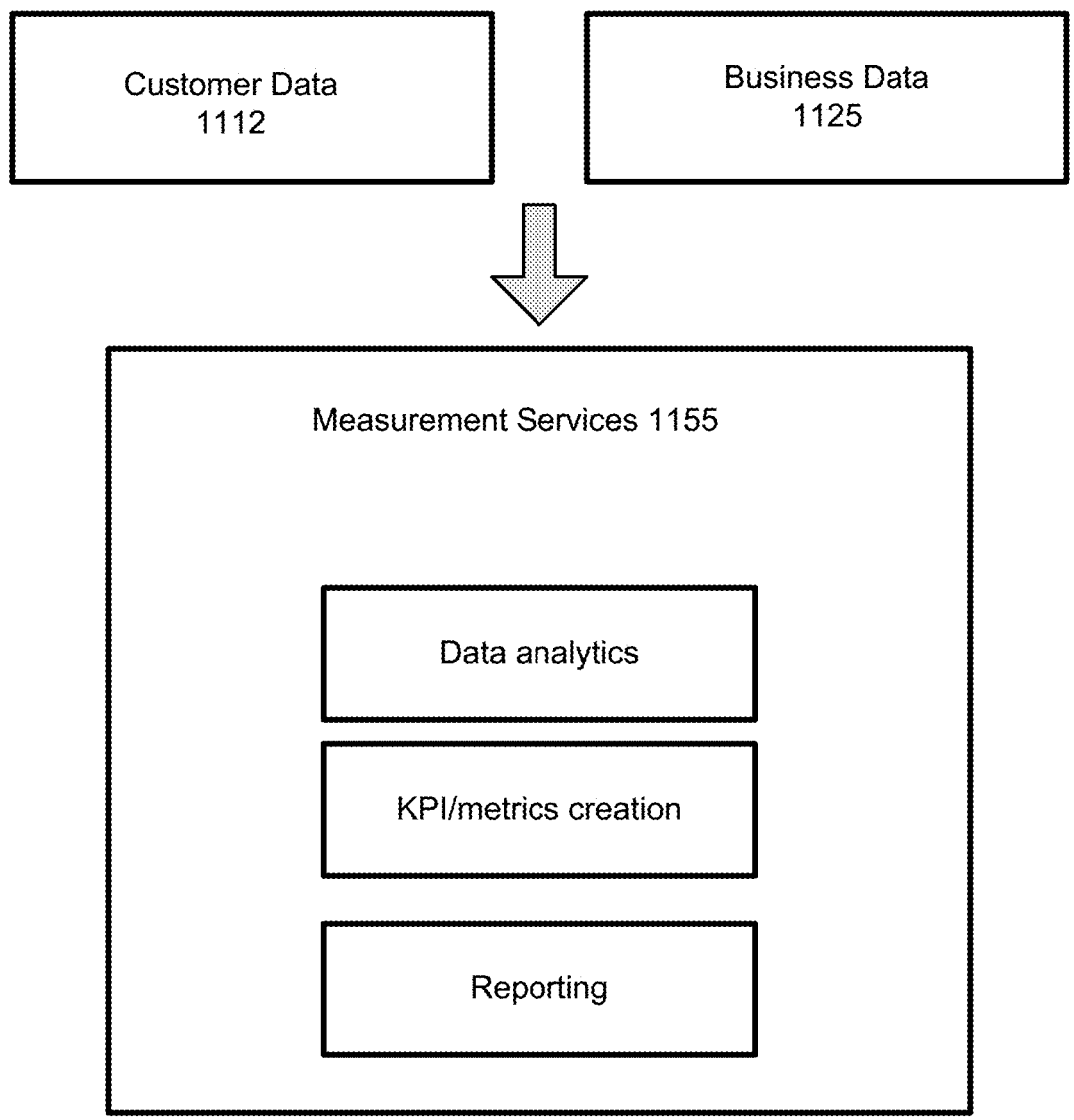
FIG. 11 is a schematic block diagram illustrating an example of measurement services according to aspects of the disclosure.

FIG. 11 illustrates example operations of measurement services 1155. As shown, the measurement services 1155 receive customer data 1112 and business data 1125, such as the customer data and business data described above in connection with FIG. 3. The measurement services may include, for example, module for data analytics, creation of metrics and/or KPIs, reporting, or other modules. For example the measurement services may utilize the data analytics module to analyze the customer data 1112 and business data 1125. Based on this analysis, the KPI/metrics creation module may be used to determine metrics or performance indicators. Those may be used to set objectives, and reports of data measured against such objectives can be generated.

The measurement services 1155 may detect an event. By way of example, such event may be a user doing a transaction with their credit card. The measurement services 1155 may determine a value for the event. Using the same example, the value for the credit card transaction may be a dollar amount charged to the credit during the transaction. Enriched customer data is updated using the value or cost. For example, enriching the customer data may include indicating that the user is active for credit card transactions.

An output of the measurement services may be utilized in a variety of machine learning or other user cases.

Example Use Cases

The systems and methods described herein may be applied in any of a variety of different contexts and implementations. According to one example, such systems and methods may be used for the optimization of customer communication and business outcomes via advertising. The system provides targeted conversion and conversion value. Examples of conversions can include when a user becomes a customer, when a user makes their first transaction, when a user makes a transaction of a threshold value, etc. Signals corresponding to the conversions can be provided to an advertising platform that is running the advertisement. The signals may be sent with corresponding value signals. This ensures a maximum alignment of advertising campaign optimization and the actual business objectives. As part of the optimization, the system reports observed events to the advertising platform and also signals predicted customer value, such value over a lifetime, back to the advertising platform in order to acquire more high value customers.

According to some examples, the system may identify highest value customers based on the received conversion signals. Such information may be provided to the advertising platform, such that the advertising platform can utilize the information in order to acquire more customers that are similar in value.

The foregoing examples are advantageous at least in that they provide for automated and optimized messaging that improved customer experience. The data intelligence platform may be applied in a variety of applications. Moreover, it is highly scalable.

It is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method of communication, comprising:
receiving data relating to an institution and its customer, the data including a specified goal for the institution;
training a machine learning model using the received data, the machine learning model comprising a dynamic next best action engine;
determining a context for the customer at any given time;
dynamically selecting, using the dynamic next best action engine, one or more experiences for delivery to the customer, wherein the selecting of the one or more experiences is optimized based on the determined context and the specified goal;
delivering the one or more experiences to the customer;
identifying, using a measurement service, one or more customer actions, the identifying comprising capturing interactions in an event log;
providing the event log to the dynamic next best action engine;
determining a value relating to the one or more experiences based on the one or more customer actions, the value quantifying a benefit to the institution of delivering the one or more experiences, the value being associated with the customer; and
continuously updating the machine learning model based on the interactions and using the determined value to improve selection of future experiences.

2. The computer-implemented method of claim 1, wherein the value is based on a cost to the institution for the action.

3. The computer-implemented method of claim 1, wherein the data comprises products or services offered by the institution, and products or services utilized by the customer.

4. The computer-implemented method of claim 1, wherein receiving the data relating to at least one of the institution or the customer comprises ingesting the data through an application programming interface.

5. The computer-implemented method of claim 1, wherein the context comprises a communication channel being used by the customer at a given time, the communication channel being a medium through which the customer communicates with the institution.

6. The computer-implemented method of claim 5, wherein the context comprises a touchpoint within a communication channel, the touchpoint including a point in communication between the customer and the institution.

7. The computer-implemented method of claim 6, wherein the touchpoint comprises one of a web page or a mobile application screen displayed to the customer at the given time, or an in-person or telephonic communication.

8. The computer-implemented method of claim 1, wherein selecting the one or more experiences comprises identifying one or more of a plurality of pre-populated experiences, each including specific content, and selecting the one or more experiences based on the content and the customer context.

9. The computer-implemented method of claim 8, wherein each experience further includes a specific format, and wherein selecting the one or more experiences comprises matching format of the one or more experiences with a format required by the context.

10. A system, comprising:
one or more memories; and
one or more processors in communication with the one or more memories, the one or more processors configured to:
receive data relating to an institution and its customer, the data including a specified goal for the institution;
train a machine learning model using the received data, the machine learning model comprising a dynamic next best action engine;
determine a context for the customer at a given time;
dynamically select, using the dynamic next best action engine, one or more experiences for delivery to the customer, wherein the selecting of the one or more experiences is optimized based on the determined context and the specified goal;
deliver the one or more experiences to the customer;
identify one or more customer actions, the identifying comprising capturing interactions in an event log;
provide the event log to the dynamic next best action engine;
determine a value relating to the one or more experiences based on the one or more customer actions, the value quantifying a benefit to the institution of delivering the one or more experiences, the value being associated with the customer; and continuously update the machine learning model based on the interactions and using the determined value to improve selection of future experiences.

11. The system of claim 10, wherein the data comprises products or services offered by the institution, and products or services utilized by the customer.

12. The system of claim 10, further comprising an ingestion interface adapted to receive the data relating to at least one of the institution or the customer.

13. The system of claim 10, wherein the context comprises a communication channel being used by the customer at a given time, the communication channel being a medium through which the customer communicates with the institution.

14. The system of claim 13, wherein the context comprises a touchpoint within a communication channel, the touchpoint including a point in communication between the customer and the institution.

15. The system of claim 14, wherein the touchpoint comprises one of a web page or a mobile application screen displayed to the customer at the given time.

16. The system of claim 10, wherein selecting the one or more experiences comprises identifying one or more of a plurality of pre-populated experiences, each including specific content, and selecting the one or more experiences based on the content and the customer context.

17. A non-transitory computer-readable medium storing instructions executable by one or more processors for performing a method of communication, comprising:
   receiving data relating to an institution and its customer, the data including a specified goal for the institution;
   training a machine learning model using the received data, the machine learning model comprising a dynamic next best action engine;
   determining a context for the customer at a given time;
   dynamically selecting, using the dynamic next best action engine, one or more experiences for delivery to the customer, wherein the selecting of the one or more experiences is optimized based on the determined context and the specified goal;
   delivering the one or more experiences to the customer;
   identifying one or more customer actions, the identifying comprising capturing interactions in an event log;
   providing the event log to the dynamic next best action engine;
   determining a value relating to the one or more experiences based on the one or more customer actions, the value quantifying a benefit to the institution of delivering the one or more experiences, the value being associated with the customer; and
   continuously updating the machine learning model based on the interactions and using the determined value to improve selection of future experiences.

18. The system of claim 17, wherein each experience further includes a specific format, and wherein selecting the one or more experiences comprises matching format of the one or more experiences with a format required by the context.

19. The computer-implemented method of claim 1, wherein identifying the one or more customer actions comprises automatically identifying proxy conversions.

* * * * *